United States Patent
Wesseloh et al.

(10) Patent No.: US 12,215,732 B2
(45) Date of Patent: Feb. 4, 2025

(54) FASTENING SYSTEM FOR THE SUSPENDED INSTALLATION OF STOWAGE COMPARTMENTS, IN PARTICULAR IN AIRCRAFT

(71) Applicant: Airbus Operations GmbH, Hamburg (DE)

(72) Inventors: Marc Wesseloh, Hamburg (DE); Sergej Marx, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 328 days.

(21) Appl. No.: 17/824,176

(22) Filed: May 25, 2022

(65) Prior Publication Data
US 2022/0381272 A1    Dec. 1, 2022

(30) Foreign Application Priority Data
May 31, 2021   (EP) .................................... 21176814

(51) Int. Cl.
*F16B 5/02*    (2006.01)
*B64D 11/00*   (2006.01)

(52) U.S. Cl.
CPC .............. *F16B 5/02* (2013.01); *B64D 11/003* (2013.01)

(58) Field of Classification Search
CPC .................................. F16B 5/02; B64D 11/003
See application file for complete search history.

(56) References Cited

U.S. PATENT DOCUMENTS

| 5,866,231 A | 2/1999 | Bodin et al. |
| 9,169,019 B2 | 10/2015 | Costabel |

(Continued)

FOREIGN PATENT DOCUMENTS

| EP | 2265492 B1 | 4/2014 | |
| EP | 2563659 B1 | 1/2016 | |
| FR | 2685756 A1 * | 7/1993 | ............. B64C 1/406 |

OTHER PUBLICATIONS

English translation FR2685756 (Year: 1993).*
European Search Report; priority document.

*Primary Examiner* — Jason L Vaughan
*Assistant Examiner* — Amanda Kreiling
(74) *Attorney, Agent, or Firm* — Greer, Burns & Crain, Ltd.

(57) ABSTRACT

A fastening system for suspended installation of stowage compartments, in particular in aircraft, includes a first fastening element, which fastens on a supporting structure, a second fastening element, which fastens on a stowage compartment, and a connecting arrangement, configured for surface-area fastening on the first fastening element. The connecting arrangement and the second fastening element each include a supporting eyelet for accommodating a fastening bolt, to fasten the connecting arrangement on the second fastening element. The first fastening element and the connecting arrangement each include a fastening surface for fastening on one another, and therefore a continuous insulation layer can be positioned between the fastening surfaces, or between the supporting structure and the first fastening element, for the purpose of insulating the supporting structure, in order for the supporting structure alone or together with the first fastening element to be insulated throughout in relation to the connecting arrangement.

13 Claims, 8 Drawing Sheets

(56) References Cited

U.S. PATENT DOCUMENTS

2008/0136071 A1\* 6/2008 Weisbeck .............. F16F 1/3935
                                                          267/140.4
2011/0088243 A1\* 4/2011 Herzog .................. B64C 1/066
                                                          403/49

\* cited by examiner

FASTENING SYSTEM FOR THE SUSPENDED INSTALLATION OF STOWAGE COMPARTMENTS, IN PARTICULAR IN AIRCRAFT

CROSS-REFERENCES TO RELATED APPLICATIONS

This application claims the benefit of the European patent application No. 21176814.8 filed on May 31, 2021, the entire disclosures of which are incorporated herein by way of reference.

FIELD OF THE INVENTION

The invention relates to a fastening system for the suspended installation of stowage compartments, in particular in aircraft.

BACKGROUND OF THE INVENTION

It is usually the case that passenger areas of means of transport, for example cabins of commercial aircraft, are provided with stowage compartments which can be installed in a suspended manner, usually serve as carriers for hand baggage as well as for items of clothing and other passenger-related items and are referred to as overhead stowage compartments or hat racks. For fastening the stowage compartments on a supporting structure of the aircraft, use is made of fastening systems by means of which the stowage compartments can be installed in a suspended manner and, in this way, form ceiling-mounted containers for example in the passenger cabin.

The stowage compartments are often very large and have to have a high load-bearing force in order to accommodate, for example, the hand baggage of a large number of passengers. Accordingly, it should be possible for the operations of installing and also removing the stowage compartments to take place as quickly as possible and with as little manpower as possible and also, as far as possible, without any tools being used. Furthermore, it is necessary for the fastening systems for the stowage compartments or overhead bins to withstand high levels of loading so that, in the loaded state, they withstand the forces which occur during the flight, and the loading associated therewith, and therefore ensure reliable fastening of the stowage compartments.

The suspended fastening of the stowage compartments on the supporting structure usually takes place by means of fastening systems which each have a pair of supporting eyelets and a bolt, which is introduced into the two supporting eyelets, in order to connect these to one another. For this purpose, for example, one supporting eyelet is arranged on a fastening element and another supporting eyelet is arranged on the stowage compartment. In order for the bolt to be pushed into the supporting eyelets of the pair of supporting eyelets, the two supporting eyelets are aligned with one another.

EP 2 563 659 B1 describes a fastening system for ceiling-mounted containers which can be installed in a suspended manner, having a pair of supporting eyelets, which can be fitted on a supporting structure and on a ceiling-mounted container, and having a main bolt for connecting the supporting eyelets in a releasable manner. The main bolt is prestressed resiliently, in a main-bolt guide, in the direction of the first supporting eyelet and, with the ceiling-mounted container not yet installed, assumes an end position in which the main bolt is extended out of the main-bolt guide. During the upward movement of the ceiling-mounted container into its installed position, the spring prestressing causes the main bolt to be extended, with the aid of a sloping ramp which is formed on the first supporting eyelet, into a mount of the first supporting eyelet, where the main bolt can be locked in a form-fitting manner A stop here is designed in the form of a centrally arranged pin, and the main bolt has a bore which is designed in a manner complementary to the pin and in which the pin can be accommodated.

Figure 2:
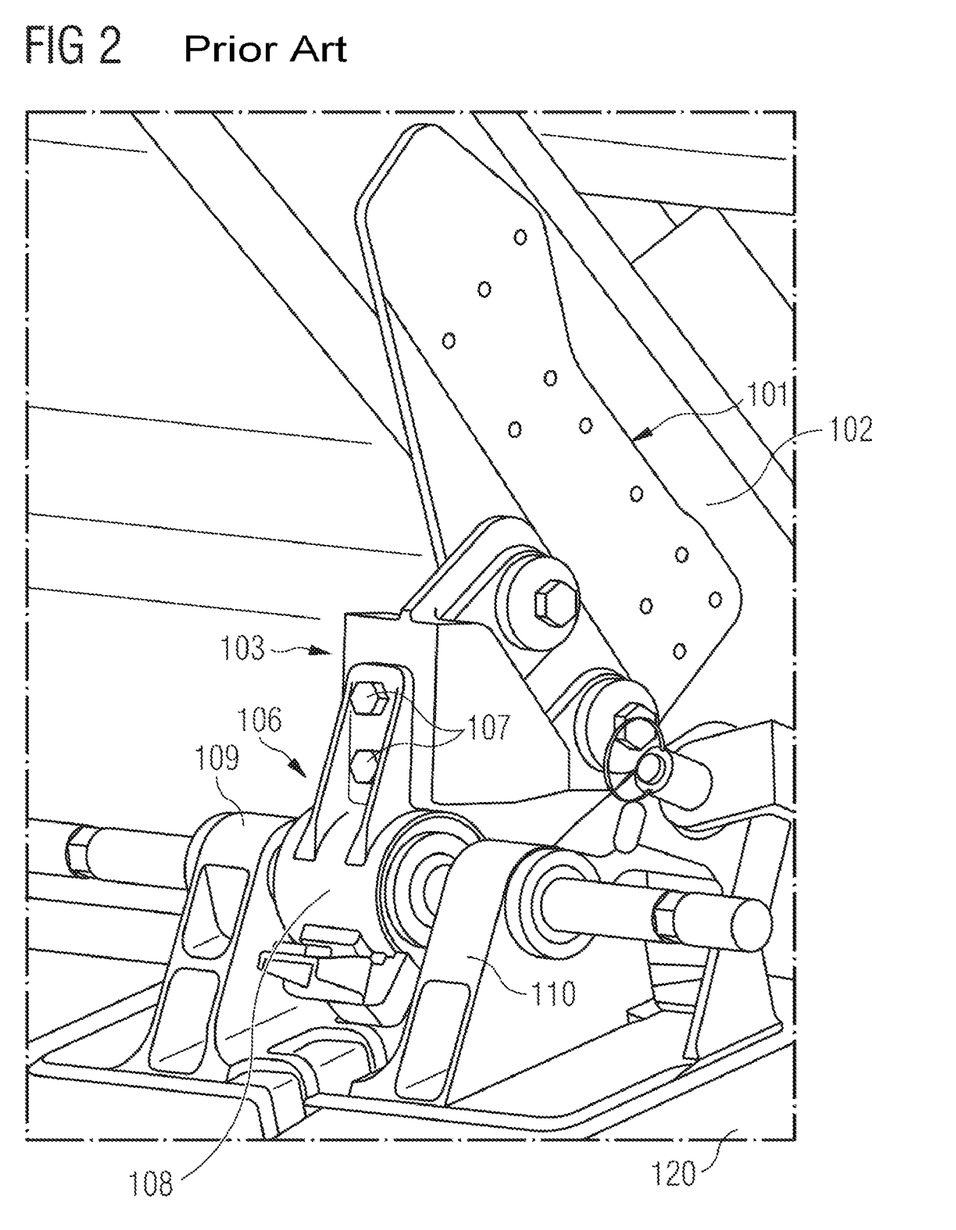
FIG. 2 shows a schematic illustration of a known fastening system for ceiling-mounted containers, as is described in the introduction.

FIG. 2 shows a known fastening system for a ceiling-mounted container 120, which forms an overhead stowage compartment (OHSC) or an overhead bin or a hat rack in the cabin of an aircraft. The known fastening system is configured, for example, as has been described in detail in the aforementioned patent publication. It comprises a plate-like, first fastening element 101, which serves for fastening on a supporting structure or on a frame member 102 of the aircraft. A second fastening element 103 is screwed to the first fastening element 101.

The second fastening element 103 is screwed to a third fastening element 106 with the aid of screws 107. The third fastening element 106 is provided with a double supporting eyelet 108, on the two sides of which a respective further supporting eyelet 109, 110 is arranged in alignment therewith. A respective bolt is arranged in the supporting eyelets 109, 110 and, by being introduced into the central double supporting eyelet 108 from both sides, fastens the ceiling-mounted container 120 on the third fastening element 106. A clip-in and snap-fit system is provided for fixing purposes.

The known fastening system is intended to provide for advantageous installation within a small period of time. However, there is a disadvantage, for example, in that the parts of the fastening system are relatively expensive to produce and have a relatively high weight. It is also necessary for the hat rack or the OHSC to be rocked around during the installation operation in order for the click-in and snap-fit function to be performed. In addition, a further rig is necessary so as to avoid uncontrolled forces getting into the frame structure. Added to this is the fact that very complex precision adjustment is necessary, which can require for example 15 minutes or more for each fastening system used.

A further problem is posed by condensation, large quantities of which form on the supporting structure, in particular in the case of an aircraft as it passes through different altitudes. It is possible here for the condensation in the region of the fastening system to pass to the stowage compartment and into the cabin interior.

SUMMARY OF THE INVENTION

It is an object of the invention to overcome the aforementioned disadvantages. In particular, the intention is to create a fastening system which is intended for the suspended installation of (overhead) stowage compartments and by means of which condensation which forms on the supporting structure is effectively prevented from penetrating into the region of the interior. Furthermore, the fastening system is intended to reduce weight. In addition, the intention is for it to be possible for the fastening system to save time and costs, in particular during installation.

The invention provides a fastening system for the suspended installation of stowage compartments, in particular in aircraft, comprising: a first fastening element, which is configured for fastening on a supporting structure; a second fastening element, which is configured for fastening on a stowage compartment for accommodating items; and a connecting arrangement, which is configured for surface-area fastening on the first fastening element, wherein the connecting arrangement and the second fastening element each comprise a supporting eyelet for accommodating a fastening bolt, in order for the connecting arrangement to be fastened on the second fastening element; and the first fastening element and the connecting arrangement each have a fastening surface for fastening on one another, and therefore a continuous insulation layer can be positioned between the fastening surfaces, and/or between the supporting structure and the first fastening element, for the purpose of insulating the supporting structure, in order for the supporting structure to be insulated throughout in relation to the connecting arrangement.

This means that it is possible for a layer for insulating a primary structure to be installed without a cut or an aperture having to be made in the insulating layer. This prevents condensation from passing into the cabin.

The invention makes it possible for the supporting structure, for example, together with the first fastening element, to be insulated throughout in relation to the connecting arrangement. For example, for this purpose, the first fastening element and the connecting arrangement are configured such that they can be screw-connected to one another. For example, the first fastening element is connected to the supporting structure in a non-releasable manner, in particular, by riveting.

However, the first fastening element can also advantageously be configured such that it can be screwed to the supporting structure. As a result, the insulation can also be clamped in between the supporting structure or primary structure and the first fastening element.

In this way, the invention provides an increased level of flexibility during installation of the insulation layer, since the latter can be positioned and installed, in accordance with the respective requirements, such that it is not possible for any moisture to pass, in the region of the fastening system, from the supporting structure to the stowage compartment.

The connecting arrangement preferably comprises a first connecting element and at least one second connecting element, which can be adjusted and fixed in position relative to one another.

This means that the position of the first supporting eyelet can be quickly adjusted in relation to the position of the second supporting eyelet.

The connecting elements advantageously each have a connecting surface with a toothing formation for fixing on one another.

This means that, when the connecting elements are fastened on one another, the connecting surfaces can interengage, which provides for quick and reliable adjustment of the position of the connecting elements relative to one another and therefore quick adjustment of the position of the supporting eyelet of the connecting arrangement. This creates an adjustable connection which can be subjected to loading to particularly good effect.

The connecting arrangement is preferably produced from plastic.

This considerably reduces the weight of the fastenings of the stowage compartments of an aircraft.

The fastening system advantageously comprises a toothing plate which is provided with a toothing formation and is produced from plastic.

In particular, the toothing plate can be fastened on a toothed side surface of one of the connecting elements, in order for the connecting element to be fixed in a desired position between the connecting plate and the other connecting element by mutual toothing engagement.

The plastic is preferably a carbon-fiber-reinforced plastic and/or a glass-fiber-reinforced plastic.

In particular, the first fastening element is produced from aluminum.

The fastening system advantageously comprises a vibration damper, which is arranged in at least one of the supporting eyelets.

The connecting arrangement is preferably produced by injection molding and/or by overmolding.

The toothing plate is advantageously produced by injection molding and/or by overmolding.

In the joined-together state of the fastening system, the connecting surfaces of the connecting elements are preferably oriented parallel to a fastening surface for fastening the first fastening element on the supporting structure.

In the joined-together state of the fastening system, the connecting surfaces of the connecting elements are advantageously oriented parallel to a fastening surface between the first fastening element and the first connecting element.

In the joined-together state of the fastening system, it is also advantageously possible for the connecting surfaces of the connecting elements to be oriented perpendicularly in relation to a fastening surface between the first fastening element and the first connecting element.

The second connecting element is preferably of at least partially plate-like design.

For example, the supporting eyelet of the connecting arrangement is formed in the plate-like region of the second connecting element.

The second connecting element is advantageously of planar design. It merges continuously, for example, from a relatively wide part in the region of its connecting surface, which serves for connection to the first connecting element, into a relatively narrow part, in which preferably the supporting eyelet of the connecting arrangement is formed.

Markings such as, for example, notches or small holes are preferably integrated in the individual components or fastening and connecting elements. This ensures preliminary alignment during installation of the components. When these markings coincide, the components are optimally aligned on a preliminary basis, and this renders installation easier. At a later stage, i.e., when the stowage compartments, designed for example in the form of hat racks, are being aligned, it is then possible, if appropriate, to deviate from the preliminary alignment.

BRIEF DESCRIPTION OF THE DRAWINGS

Preferred embodiments of the invention will be explained in more detail hereinbelow with reference to the accompanying drawings, in which.

In the figures, like or corresponding elements are each denoted by like reference signs and therefore, if not expedient, are not described anew. What is disclosed throughout the description can be transferred analogously to like components with like reference signs or like component descriptions. It is also the case that the positional information selected in the description, e.g., above/top, below/bottom, lateral, etc., relates to the figure directly described and illustrated and, in the case of a position being changed, can be transferred analogously to the new position. Furthermore, it is also possible for individual features or combinations of features from the different exemplary embodiments shown and described to constitute independent or inventive solutions or solutions according to the invention.

DETAILED DESCRIPTION OF THE PREFERRED EMBODIMENTS

Figure 1:
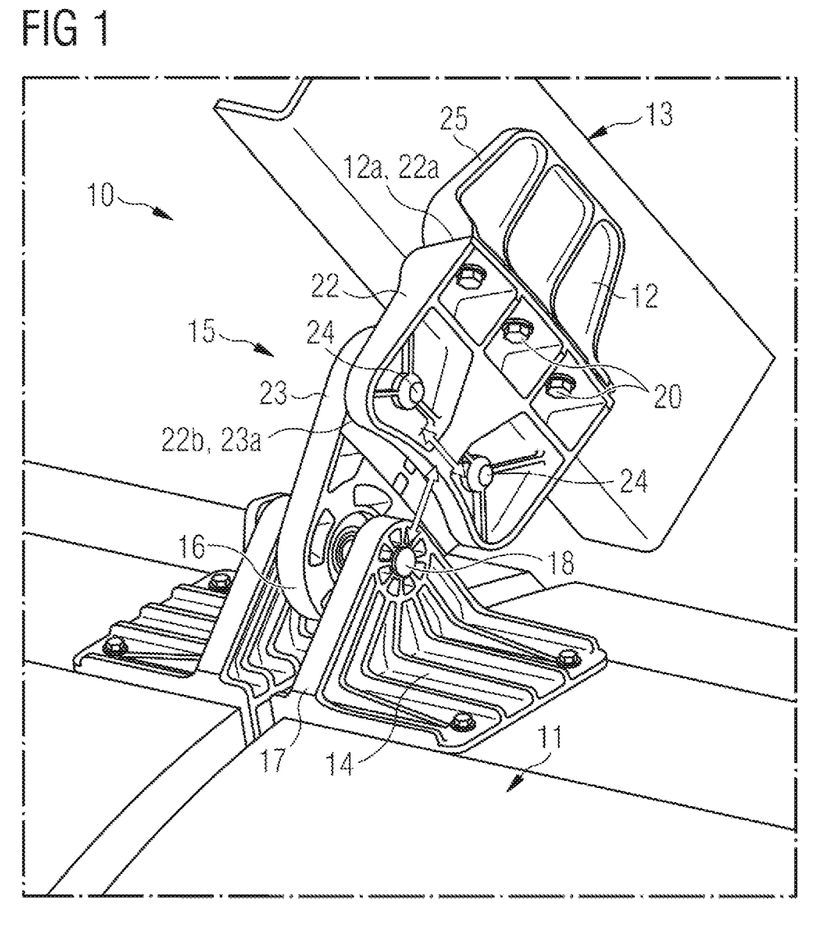
FIG. 1 shows a schematic view, as seen obliquely from the front, of a fastening system according to a preferred embodiment of the invention.

FIG. 1 shows a three-dimensional schematic view, as seen obliquely from the front, of a fastening system 10 according to a preferred embodiment of the invention. The fastening system 10 serves for the suspended installation of stowage compartments 11 in an aircraft. The stowage compartments 11 can be, for example, overhead bins, ceiling-mounted containers, baggage compartments, baggage containers, stowage containers or the like which are, or can be, installed in a suspended manner, for example in an aircraft cabin, and form, in particular, so-called overhead stowage compartments or hat racks.

The fastening system 10 comprises a first fastening element 12, which is configured to fasten on a supporting structure 13. For this purpose, the first fastening element 12 has a fastening surface 25, by means of which it is fastened on the supporting structure 13. The supporting structure 13 is, for example, a frame member of a fuselage.

The fastening system 10 also comprises a second fastening element 14, which is configured to fasten on the stowage compartment 11, which is to be mounted in a suspended manner and part of which is illustrated in FIG. 1. A connecting arrangement 15 is provided between the first fastening element 12 and the second fastening element 14, the connecting arrangement being designed for surface-area fastening on the first fastening element 12.

The connecting arrangement 15 comprises a supporting eyelet 16 and the second fastening element 14 comprises a supporting eyelet 17. The supporting eyelets 16, 17 are configured to accommodate a fastening bolt 18, and therefore, by being accommodated in the supporting eyelets 16 and 17, the fastening bolt fastens the connecting arrangement 15 on the second fastening element 14 when the supporting eyelets 16, 17 are arranged in alignment with one another.

In the example shown here, a respective supporting eyelet 17 of a second fastening element 14 is arranged on either side of the supporting eyelet 16. However, it is likewise possible for a supporting eyelet 17 of a second fastening element 14 to be arranged just on one side.

The first fastening element 12 and the connecting arrangement 15 comprise a respective fastening surface 12a, 22a, via which the connecting arrangement 15 can be, or is, fastened on the first fastening element 12. Fastening takes place by means of screws 20.

Figure 6:
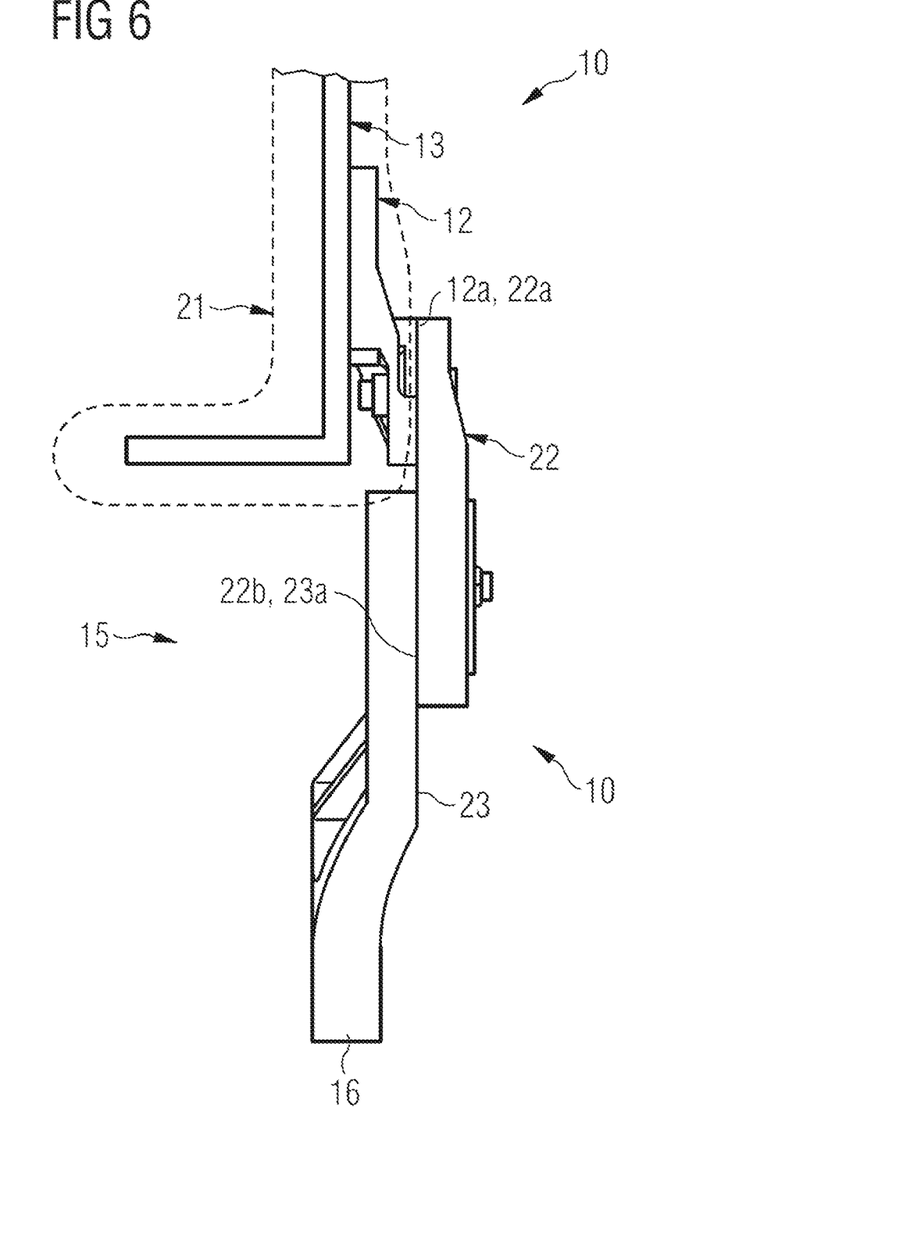
FIG. 6 shows a schematic side view of the fastening system which is shown in FIGS. 3 to 5 and has been fastened on a supporting structure.

This means that, during installation, a continuous insulation layer 21, which is shown in FIG. 6, can be positioned and installed between the fastening surfaces 12a, 22a for the purpose of insulating the supporting structure 13. As a result, the supporting structure 13 together with the first fastening element 12, which is fastened on the supporting structure 13, can be insulated throughout in relation to the connecting arrangement 15, without slits, apertures or the like having to be made in the insulation layer 21.

During installation, it is only the screws 20 which are fitted through the insulation layer 21, and they are therefore enclosed in a flush manner, and with sealing against moisture, by the insulation layer 21 in the region between the first fastening element 12 and the connecting arrangement 15. In this way, it is not possible for any condensation, large quantities of which form on the supporting structure 13 for example at different altitudes, to penetrate, in the fastening region of the stowage compartments, through interruptions in the insulation layer 21, or through openings made in the insulation layer, and to pass into the cabin area.

The connecting arrangement 15 comprises a first connecting element 22 and a second connecting element 23, which can be adjusted and fixed in position relative to one another. The fastening system 10 therefore comprises the first fastening element 12, the second fastening element 14 and the connecting arrangement 15 with its first connecting element 22 and its second connecting element 23.

The first fastening element 12 is configured in the form of a so-called A bracket, that is to say, in the form of a class A holder, which can be fastened on a supporting structure of an aircraft and is configured to fasten a so-called B bracket, that is to say, a class B holder.

The connecting arrangement 15 or the first connecting element 22 thereof is configured in the form of a B bracket, which can be fastened on the A bracket or the first fastening element 12 by means of the screws 20.

The second connecting element 23 of the connecting arrangement 15 is likewise configured in the form of a B bracket. During installation, it is connected to the first connecting element 22 by means of screws 24. The second connecting element 23 here is fastened on the first connecting element 22 so as to be moveable in two directions, wherein the movement directions are oriented perpendicularly in relation to one another and are denoted in the figure by double arrows.

In this way, the position of the supporting eyelet 16 relative to the first connecting element 22, and therefore also relative to the supporting structure 13, can be adjusted in two degrees of freedom before fixing in the appropriate position is provided with the aid of the fastening means 24. This allows the stowage compartments 11 to be adjusted appropriately, which, in addition to the resulting mechanical improvement, also results in consistent, uniformly running visual lines of the stowage compartments installed in this way.

In the region of the connection between the first connecting element 22 and the second connecting element 23, these connecting elements each have a respective connecting surface 22b, 23a, which, during installation, are directed towards one another and are each provided with a toothing formation. This makes it possible to adjust the position of the second connecting element 23 in relation to the first connecting element 22, wherein, by virtue of the screws 24 being tightened, the toothing formations of the connecting surfaces 22b, 23a then interengage and thus establish a force-fitting and form-fitting connection between the connecting elements 22, 23. This renders the connection particularly stable, and therefore the adjusted position is maintained even under particularly high loads.

The first fastening element 12 is produced from aluminum and is fastened on the supporting structure 13 or the frame member of the fuselage, for example, by riveting. The connecting arrangement 15 with its connecting elements 22, 23 is produced from plastic, preferably from fiber-reinforced or carbon-fiber-reinforced and/or glass-fiber-reinforced plastic. In particular, the connecting elements 22, 23 and the connecting arrangement 15 can be produced by injection molding.

In the exemplary embodiment shown here, the connecting surfaces 22b, 23a of the respective connecting elements 22, 23 are oriented perpendicularly in relation to the fastening surfaces 12a, 22a, by means of which the connecting arrangement 15 is, or can be, fastened on the first fastening element 12 by way of its first connecting element 22.

Figure 3:
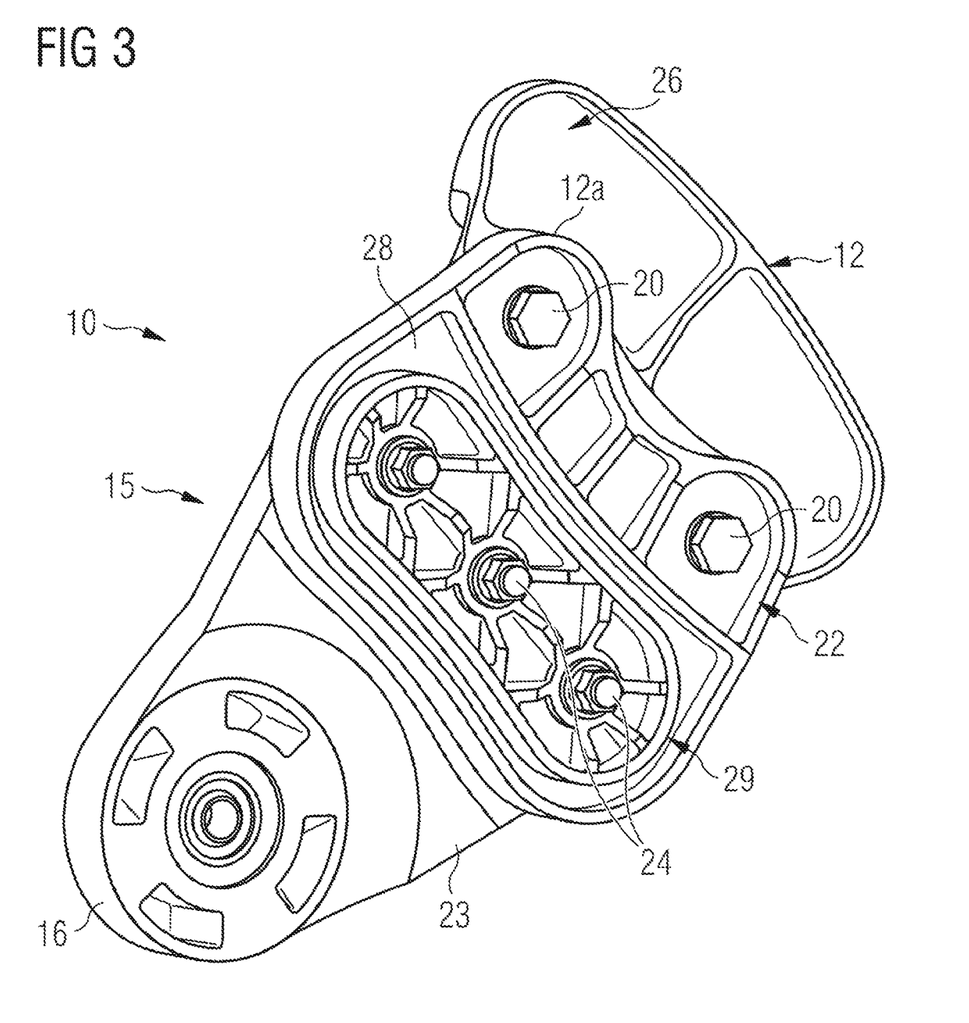
FIG. 3 shows a schematic view of the front side of a fastening system according to a particularly preferred embodiment of the invention.

A fastening system 10 according to a different preferred embodiment of the invention will be described in detail hereinbelow with reference to FIGS. 3 to 5. FIG. 3 here shows a schematic view of the front of the fastening system 10, whereas FIGS. 4 and 5 respectively show a schematic exploded illustration and a schematic view of the rear side of the fastening system 10. To simplify matters, these figures do not illustrate the second fastening element 14. With the exception of a few differences, the fastening system is configured to be identical or similar to that of FIG. 1.

As described above with reference to FIG. 1, the first, plate-like fastening element 12 serves for surface-area fastening on the supporting structure 13. It has its rear side 25, which can be seen in FIG. 5 and forms a fastening surface, fastened on the supporting structure 13, that is to say, for example, on a side surface of the frame member.

The first connecting element 22 of the connecting arrangement 15 has been screwed, with the aid of the screws 20, on the front side 26 of the first fastening element 12, which can be seen in FIG. 3. For this purpose, the front side 26 of the first fastening element 12 forms the fastening surface 12a for fastening the first connecting element 22. Accordingly, the fastening surface 22a is provided on the rear side 27 of the first connecting element 22 (see FIG. 5), the fastening surface 22a being arranged opposite the fastening surface 12a of the first fastening element 12.

The second connecting element 23 of the connecting arrangement 15 has been fastened, by means of the screws 24, on the first connecting element 22. For this purpose, a connecting surface 22b for connection to the second connecting element 23 is formed on the rear side 27 of the first connecting element 22 (see FIG. 5).

Figure 4:
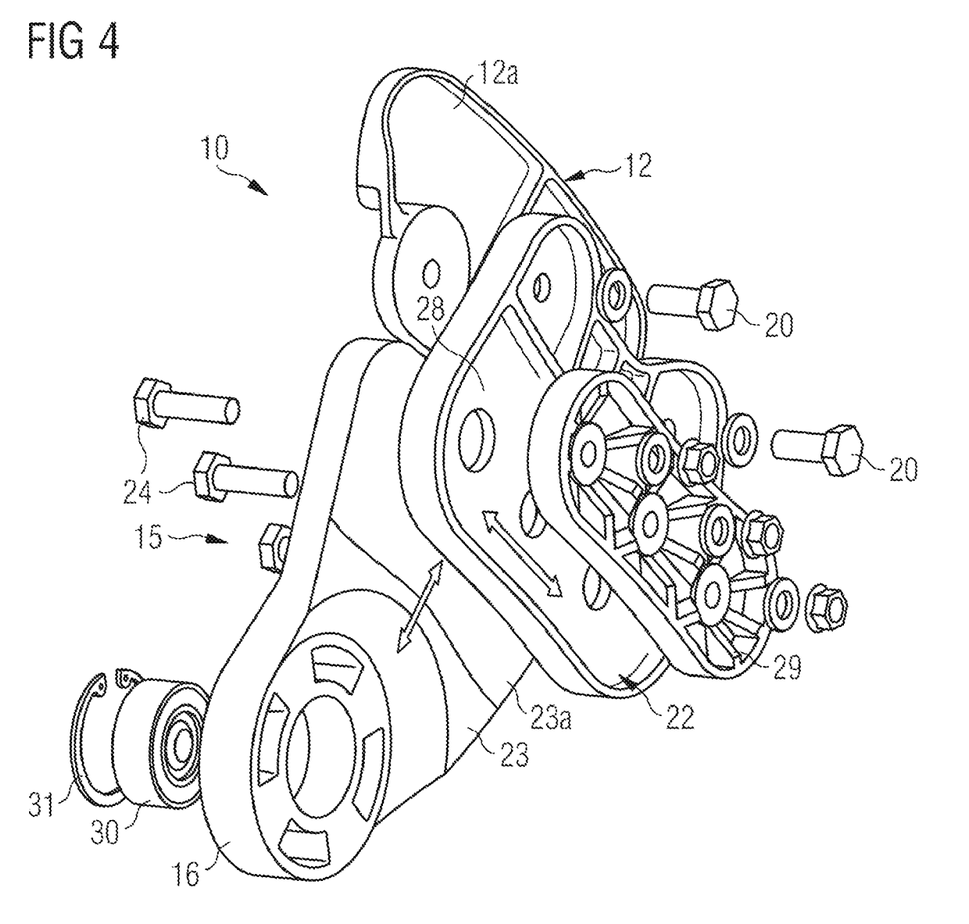
FIG. 4 shows a schematic exploded illustration of the fastening system shown in FIG. 3.
Figure 5:
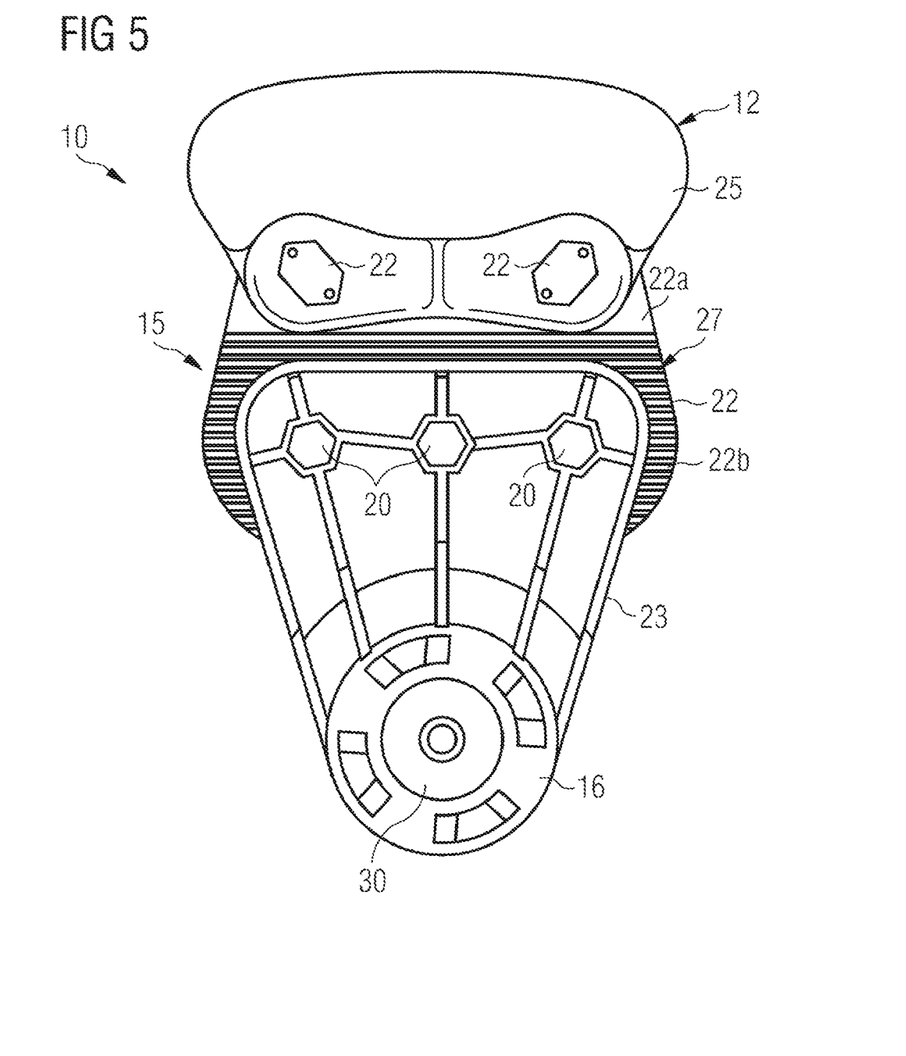
FIG. 5 shows a schematic view of the rear side of the fastening system shown in FIGS. 3 and 4.

The connection between the first connecting element 22 and the second connecting element 23 is designed such that the two connecting elements 22, 23 can be moved relative to one another in two directions which are oriented orthogonally in relation to one another, as is denoted in FIG. 4 by double arrows. This allows adjustment of the position of the second connecting element 23 in relation to the first connecting element 22, and the appropriate position can be fixed and secured by subsequent tightening of the screws 24.

For the purposes of adjusting and fixing the desired position of the second connecting element 23, which can be moved in relation to the first connecting element 22, use is made, in addition, of a toothing formation which is formed on the rear side 27 of the first connecting element 22. Corresponding to this, a toothing formation is likewise formed on the oppositely arranged connecting surface 23a of the second connecting element 23, it being possible for the connecting surface 23a to be seen in FIG. 4.

Tightening of the fastening screws 20 and/or of the associated nuts thereof fixes the second connecting element 23 in the appropriate and/or desired position on the first connecting element 22, in that the toothing formations of their corresponding or complementary connecting surfaces 22b, 23a interengage and thus ensure a high level of stability.

In addition, a toothing plate 29 is arranged on the other side of the first connecting element 22, i.e., on the front side 28 of the same, this front side forming a further connecting surface and being visible in FIGS. 3 and 4. On its side which is directed towards the first connecting element 22, and therefore cannot be seen here, the toothing plate 29 likewise has a toothing formation, in order to interengage with a corresponding or complementary toothing formation on the front side 28 of the first connecting element 22.

Therefore, the first connecting element 22 is fastened over its surface area and on either side, in each case via toothing formations, between the second connecting element 23 and the toothing plate 29, wherein, following adjustment of the second connecting element 23, fixing takes place by virtue of the fastening screws 24 being tightened, these fastening screws extending through the second connecting element 23, the first connecting element 22 and the toothing plate 29 and engaging in associated nuts (see FIG. 4).

A vibration damper 30 is arranged in the supporting eyelet 16 of the second connecting element 23 and is fixed by a closure ring 31. This isolates the stowage compartment 11 and further interior components of the aircraft from noise and vibrations.

As in the case of the embodiment shown in FIG. 1, the first fastening element 12 is an A bracket or A holder, which is produced from aluminum. The first connecting element 22 and the second connecting element 23, as described above, are configured in the form of a B bracket or B holder and produced from plastic, preferably from carbon-fiber-reinforced or glass-fiber-reinforced plastic. These measures and the design illustrated here give rise to the fastening system 10 having a particularly low weight along with a very high load-bearing force.

Figure 7:
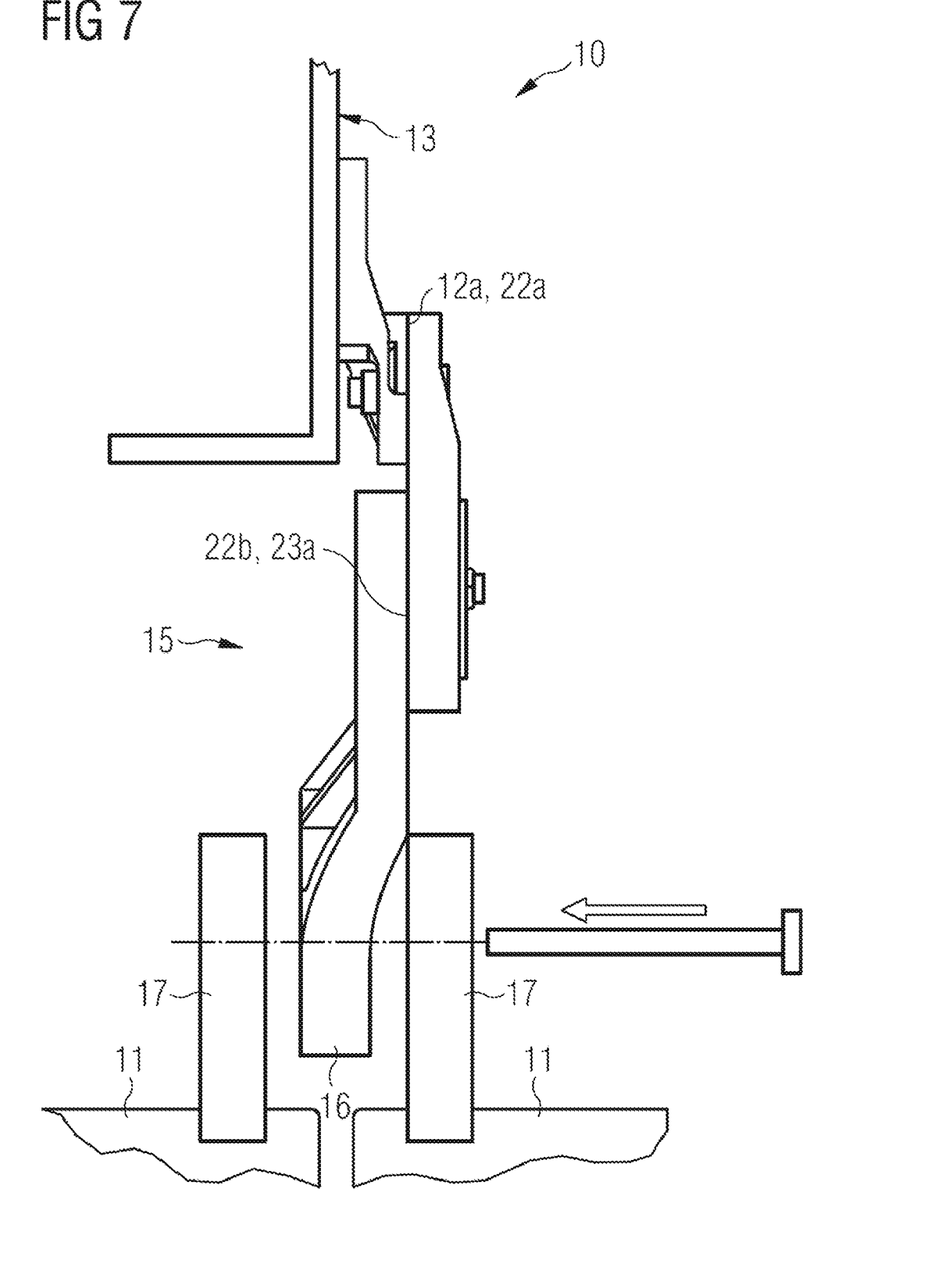
FIG. 7 shows a schematic side view of the fastening system shown in FIGS. 3 to 5 together with its fastening element for fastening on a stowage compartment.

FIGS. 6 and 7 show a side view of the fastening system 10, together with the supporting structure 13 on which it is fastened. In addition, FIG. 7 also shows the fastening of the supporting eyelet 16 of the connecting arrangement 15 between two supporting eyelets 17 of second fastening elements 14, on which an arrangement of stowage compartments 11 has been fastened. The fastening system 10 is configured in the manner described above with reference to FIGS. 3 to 5.

As shown in FIG. 6, the supporting structure 13 or the frame member of the fuselage, together with the first fastening element 12 fastened thereon, is enclosed by the insulation layer 21. In the region of the fastening surfaces 12a, 22a, and also outside these, the insulation layer 21 extends continuously between the first fastening element 12 and the first connecting element 22 of the connecting arrangement 15. In this way, the supporting structure 13 with the first fastening element 12 fastened thereon is insulated fully, and without interruption, in relation to the connecting arrangement 15 and the stowage compartment retained thereon. The insulation layer 21 is configured for heat insulation and moisture insulation.

In the case of the embodiment of the fastening system 10 which is shown in FIGS. 3 to 7, in the joined-together state of the fastening system 10, the connecting surfaces 22b, 23a for fastening the connecting elements 22, 23 on one another are oriented parallel to the fastening surface 12a, 22a between the first fastening element 12 and the first connecting element 22.

Figure 8:
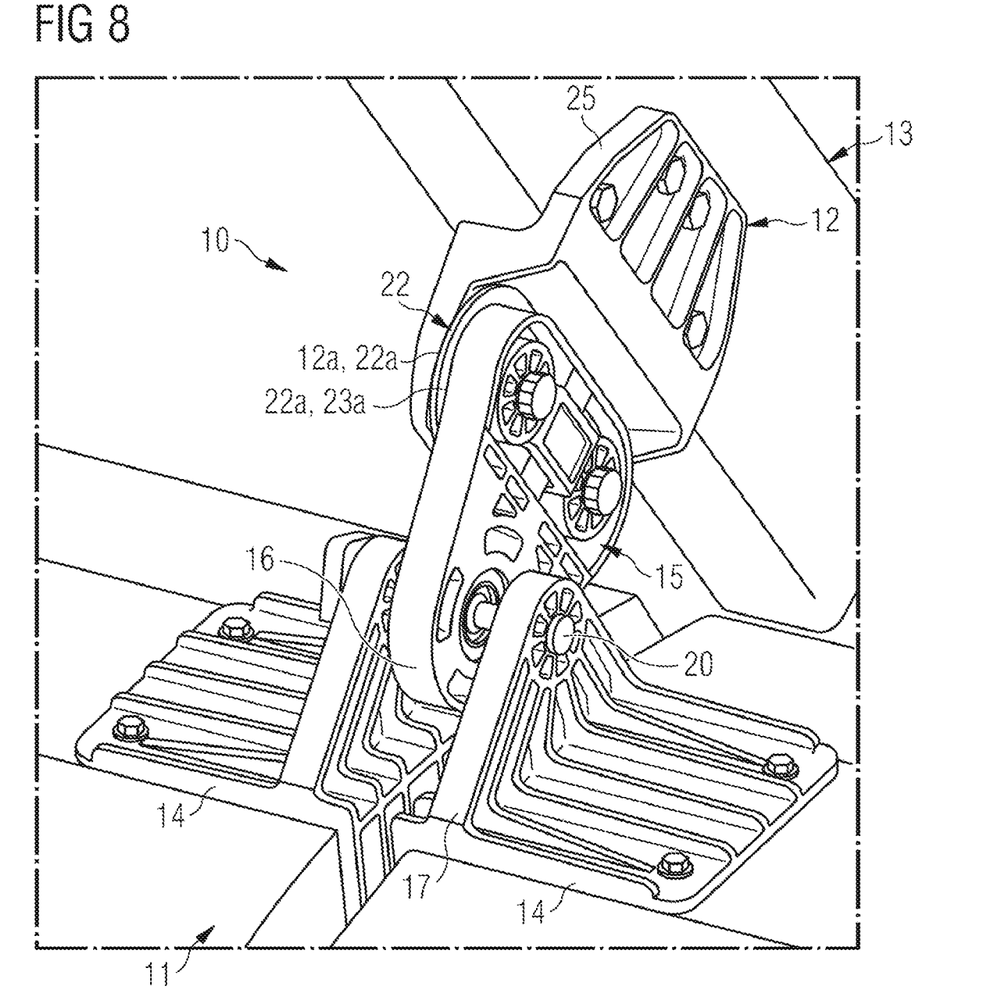
FIG. 8 shows a three-dimensional schematic view, as seen obliquely from the front, of a fastening system according to a different preferred embodiment of the invention, which has been fastened on a supporting structure.

FIG. 8 shows a further embodiment of the fastening system 10. In the same way as in the embodiments described above, the connecting arrangement 15 comprises a first connecting element 22 and a second connecting element 23, which can be moved relative to one another in two degrees of freedom, as shown in FIG. 4 and already explained above. However, in the case of the embodiment shown in FIG. 8, the first connecting element 22 is configured in the form of a relatively thin plate which has its surface area arranged between the second connecting element 23 and the first fastening element 12.

The first fastening element 12 forms an offset between its fastening surface 25 for fastening on the supporting structure 13 and its fastening surface 12a for fastening the connecting arrangement 15 and/or the first connecting element 22.

Here too, as described above with reference to FIG. 6, it is possible for the insulation layer 21 to be positioned and installed between the first fastening element 12 and the first connecting element 22 of the connecting arrangement 15 so that, in the installed state, it gives rise to continuous and complete insulation of the supporting structure 13, with the first fastening elements 12 fastened thereon, in relation to the connecting arrangement 15.

As an alternative to this, the insulation layer 21 illustrated in FIG. 6 can be clamped in between the supporting structure 13 and the first fastening element 12. For this purpose, the first fastening element 12 is screwed to the supporting structure 13.

The connecting surfaces for connecting the connecting elements 22, 23 to one another are formed by one side 22b of the first connecting element 22 and by the opposite side 23a of the second connecting element 23. These connecting surfaces 22b, 23a are oriented parallel to the fastening surface 25 of the first fastening element 12 on the supporting structure 13. They are also formed parallel to the fastening surfaces 12a, 22a, which serve for fastening the first connecting element 22 on the first fastening element 12.

It is also the case with this embodiment that the first fastening element 12 is configured in the form of an A holder, whereas the second connecting element 23 is configured in the form of a B holder, in order to fasten the stowage compartments 11. The connecting elements 22, 23 and the second fastening element 14, which is configured to fasten the stowage compartments 11, are produced from plastic, preferably from fiber-reinforced and, in particular, from carbon-fiber-reinforced and/or glass-fiber-reinforced plastic.

The invention provides, in particular, the following advantages:

Dividing the fastening system 10 into A and B holders or A and B brackets makes it possible to install a layer between the two holders for the purpose of insulating the primary structure and, in the process, to avoid any cut in the insulating layer. This prevents condensation from passing into the cabin.

Moreover, the invention gives the further advantage of it being possible for the fastening system to be adjusted in two directions, preferably two directions which are perpendicular in relation to one another. Mutually opposite toothing formations here allow adjustment of the interface in relation to the ceiling-mounted container or the overhead stowage compartment (OHSC).

In addition, the interior components are isolated from noise or vibrations. This is made possible by the vibration damper which is preferably integrated in the B holder or in the connecting element and is fixed in the B holder by a straightforward snap-fit closure ring. This fixing allows the vibration damper to be very easily replaced at the end of its service life.

Commercially available standard parts are used for the purpose of installing the fastening system 10 and the parts thereof, i.e., there is no need for any special fastening means or specifically developed bearings.

The invention is based, in particular, on three parts of a bracket or fastening concept, wherein each part can advantageously be produced from fiber-reinforced plastic, in particular, by means of injection molding.

The invention proposes two possible solutions in order to avoid any risk of corrosion which can be generated by the combination of carbon-fiber-reinforced plastic and aluminum, and these two solutions can also be combined with one another. On the one hand, for the purpose of isolating the materials, a non-conductive layer of material can be arranged between the carbon-fiber-reinforced plastic and the aluminum. On the other hand, carbon-fiber reinforcement can be replaced by glass-fiber reinforcement.

In order for the load-bearing force and loading capability of the fastening system to be increased yet further, an additional fiber insert can be produced by means of overmolding technology, this further increasing the load-bearing capacity of the holders and/or of the elements of the fastening system. Overmolding is an injection-molding process in which one material is formed onto a second material, which is typically a solid polymer or plastic material. As a result, the thermoplastic material which has been formed on can undergo strong bonding with the plastic and this can be maintained in the user environment.

A further advantage is that connection to the stowage compartment or ceiling-mounted container can be established by a straightforward standard bolt. The bolt fastens preferably two stowage compartments or OHSCs on a bracket or holder.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 Fastening system
11 Stowage compartment
12 First fastening element
12a Fastening surface for the connecting arrangement
13 Supporting structure 14 Second fastening element
15 Connecting arrangement
16 Supporting eyelet
17 Supporting eyelet
18 Fastening bolt
20 Screws
21 Insulation layer
22 First connecting element
22a Fastening surface for fastening on the first fastening element
22b Connecting surface in relation to the second connecting element
23 Second connecting element
23a Connecting surface in relation to the first connecting element
24 Fastening means or screws
25 Rear side or fastening surface of the first fastening element
26 Front side of the first fastening element
27 Rear side of the first connecting element
28 Front side or connecting surface of the first connecting element
29 Toothing plate
120 Ceiling-mounted container
101 First fastening element
102 Supporting structure or frame member
103 Second fastening element
106 Third fastening element
107 Screws
108 Double supporting eyelet
109, 110 Further supporting eyelet 109, 110

The invention claimed is:

1. A fastening system for suspended installation of stowage compartments, comprising:
a first fastening element, which is configured to fasten on a supporting structure;
a second fastening element, which is configured to fasten on a stowage compartment for accommodating items; and
a connecting arrangement, which is configured for surface-area fastening on the first fastening element,
wherein the connecting arrangement and the second fastening element each comprise a supporting eyelet to accommodate a fastening bolt, in order for the connecting arrangement to be fastened on the second fastening element; and
the first fastening element and the connecting arrangement each have a fastening surface for fastening on one another, and therefore a continuous insulation layer can be positioned at least one of between the fastening surfaces, or between the supporting structure and the first fastening element, for insulating the supporting structure, in order for the supporting structure to be insulated throughout in relation to the connecting arrangement,
wherein the connecting arrangement comprises a first connecting element and at least one second connecting element, which can be adjusted and fixed in position relative to one another, and,
wherein the first and the at least one second connecting elements each have a connecting surface with a toothing formation for fixing on one another.

2. The fastening system according to claim 1, wherein the connecting arrangement is produced from plastic.

3. The fastening system according to claim 1, wherein a toothing plate is provided with a toothing formation, produced from plastic and which is fastened on a toothed surface of one of the connecting elements in order for that connecting element to be fixed in a desired position between the toothing plate and one other connecting element by mutual toothing engagement.

4. The fastening system according to claim 2, wherein the plastic is at least one of a carbon-fiber-reinforced plastic or a glass-fiber-reinforced plastic.

5. The fastening system according to claim 1, wherein the first fastening element is produced from aluminum.

6. The fastening system according to claim 1, including a vibration damper, which is arranged in at least one of the supporting eyelets.

7. The fastening system according to claim 1, wherein the connecting arrangement is produced by at least one of injection molding or overmolding.

8. The fastening system according to claim 3, wherein the toothing plate is produced by at least one of injection molding or overmolding.

9. The fastening system according to claim 1, wherein, in a joined-together state of the fastening system, connecting surfaces of the first connecting element and the second connecting element are oriented parallel to a fastening surface for fastening the first fastening element on the supporting structure.

10. The fastening system according to claim 1, wherein, in a joined-together state of the fastening system, connecting surfaces of the first connecting element and the second connecting element are oriented parallel to a fastening surface between the first fastening element and the first connecting element.

11. The fastening system according to claim 1, wherein, in a joined-together state of the fastening system, connecting surfaces of the first connecting element and the second connecting element are oriented perpendicularly in relation to a fastening surface between the first fastening element and the first connecting element.

12. The fastening system according to claim 1, wherein the second connecting element is of at least partially plate-like configuration, and the supporting eyelet of the connecting arrangement is formed in a plate-like region of the second connecting element.

13. The fastening system according to claim 1, wherein the second connecting element has a planar configuration, wherein the second connecting element merges continuously from a relatively wide part in a region of its connecting surface for connection to the first connecting element into a relatively narrow part, in which the supporting eyelet of the connecting arrangement is formed.

* * * * *